United States Patent
Hatano et al.

(10) Patent No.: US 12,459,135 B2
(45) Date of Patent: Nov. 4, 2025

(54) GRIPPING DEVICE AND INDUSTRIAL ROBOT

(71) Applicant: NITTA CORPORATION, Osaka (JP)

(72) Inventors: Itaru Hatano, Yamatokoriyama (JP); Atsushi Matsumoto, Yamatokoriyama (JP); Shunsuke Iwata, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 215 days.

(21) Appl. No.: 18/554,411

(22) PCT Filed: Mar. 2, 2022

(86) PCT No.: PCT/JP2022/008734
§ 371 (c)(1),
(2) Date: Oct. 6, 2023

(87) PCT Pub. No.: WO2022/219951
PCT Pub. Date: Oct. 20, 2022

(65) Prior Publication Data
US 2024/0190021 A1    Jun. 13, 2024

(30) Foreign Application Priority Data
Apr. 12, 2021 (JP) .................. 2021-067339

(51) Int. Cl.
*B25J 15/00* (2006.01)
*B25J 15/06* (2006.01)

(52) U.S. Cl.
CPC ....... *B25J 15/0683* (2013.01); *B25J 15/0033* (2013.01)

(58) Field of Classification Search
CPC .................. B25J 15/0683; B25J 15/0033
See application file for complete search history.

(56) References Cited

U.S. PATENT DOCUMENTS 5,263,753 A  * 11/1993  Breu ................ B25J 15/0206
                                                  294/196
6,846,029 B1 *  1/2005  Ragner ................ B25B 9/00
                                                  294/219

(Continued)

FOREIGN PATENT DOCUMENTS

CN      110936368 A       3/2020
DE      19816953 A1 * 10/1999 ............ B65G 47/90

(Continued)

*Primary Examiner* — Gerald McClain
(74) *Attorney, Agent, or Firm* — Muncy, Geissler, Olds & Lowe, P.C.

(57) ABSTRACT

A gripping device includes a partition film that is elastically deformable, a vacuum pump (deformation unit) that elastically deforms the partition film, and a cylindrical gripping portion that extends from the peripheral edge of the partition film and is elastically deformed in the central axis direction along with the elastic deformation of the partition film to wrap a workpiece. When the gripping portion comes into contact with the workpiece, a sealed space is formed between the workpiece, the gripping portion, and the partition film. Since the volume of the sealed space increases due to the elastic deformation of the partition film, a negative pressure is generated in the sealed space. The gripping device reliably grips the workpiece by a frictional force acting between the workpiece and the gripping portion and a suction force due to a negative pressure generated in the sealed space.

6 Claims, 16 Drawing Sheets

(56) References Cited

U.S. PATENT DOCUMENTS

| | | | | |
|---|---|---|---|---|
| 9,623,570 | B1 * | 4/2017 | Krahn | B25J 15/0085 |
| 10,086,519 | B2 * | 10/2018 | Wagner | B65G 47/91 |
| 10,780,589 | B2 * | 9/2020 | Hwang | B25J 15/0023 |
| 10,875,196 | B2 * | 12/2020 | Nitta | B25J 15/12 |
| 11,207,787 | B2 * | 12/2021 | Hatano | B25J 15/12 |
| 11,298,833 | B2 * | 4/2022 | Hatano | B25J 15/12 |
| 11,833,668 | B2 * | 12/2023 | Sheikholeslami | B25J 15/0683 |
| 11,964,386 | B2 * | 4/2024 | Geyer | B25J 15/0023 |
| 2004/0212206 | A1 * | 10/2004 | Chang | B25J 15/12 |
| | | | | 294/99.1 |
| 2012/0038180 | A1 * | 2/2012 | Steltz | B66F 19/00 |
| | | | | 294/192 |
| 2018/0015618 | A1 * | 1/2018 | Nadler | B25J 18/06 |
| 2020/0215701 | A1 * | 7/2020 | Takahashi | B25J 15/12 |
| 2022/0024057 | A1 * | 1/2022 | Yap | B25J 15/0033 |

FOREIGN PATENT DOCUMENTS

| | | | | |
|---|---|---|---|---|
| DE | 102012100916 A1 * | 8/2013 | ......... | H05K 13/0408 |
| EP | 1369364 A1 * | 12/2003 | ......... | B25J 11/0045 |
| JP | 2009279707 A * | 12/2009 | | |
| JP | 2014200874 A * | 10/2014 | | |
| JP | 2014200877 A * | 10/2014 | | |
| JP | 2017080825 A * | 5/2017 | | |
| JP | 2017185553 A * | 10/2017 | | |
| JP | 2018-062038 A | 4/2018 | | |

\* cited by examiner

FIG. 3
(a)
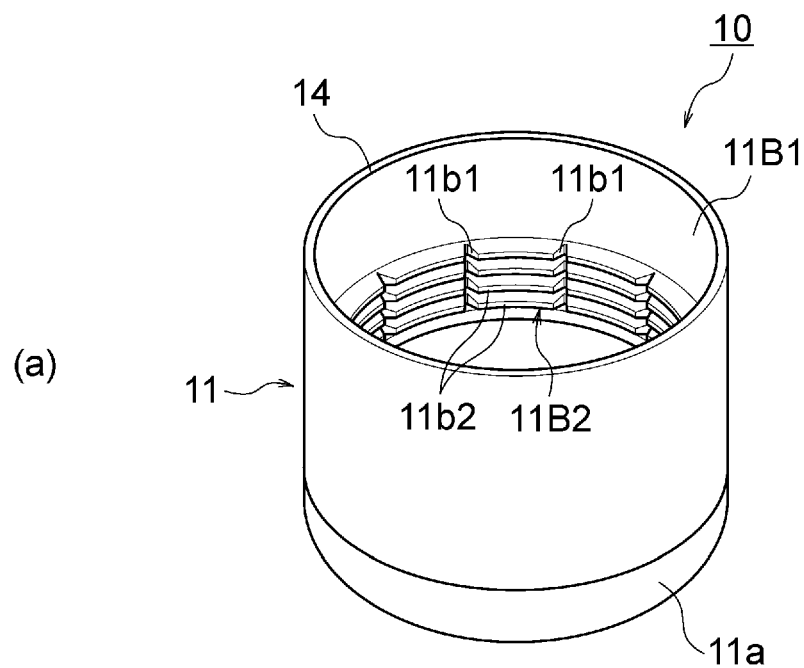
(b)
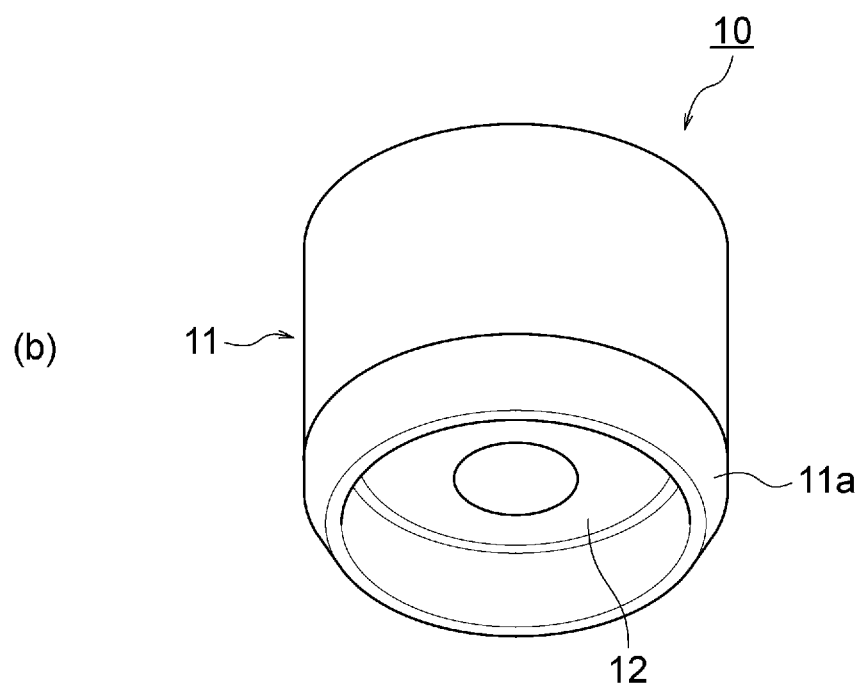

FIG. 4
(a)
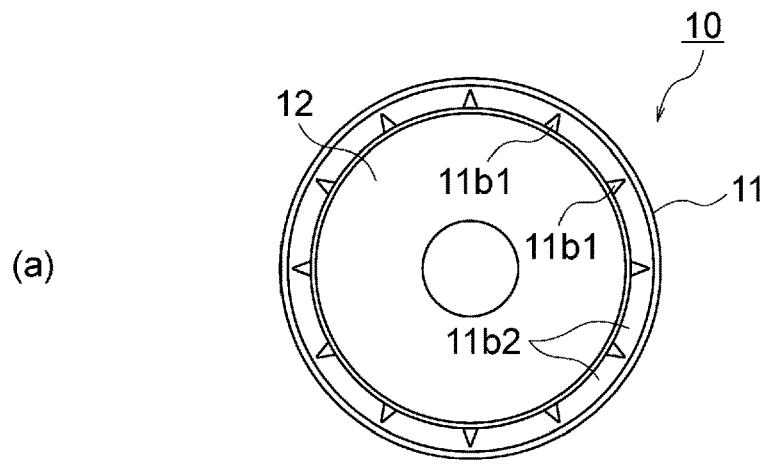
(b)
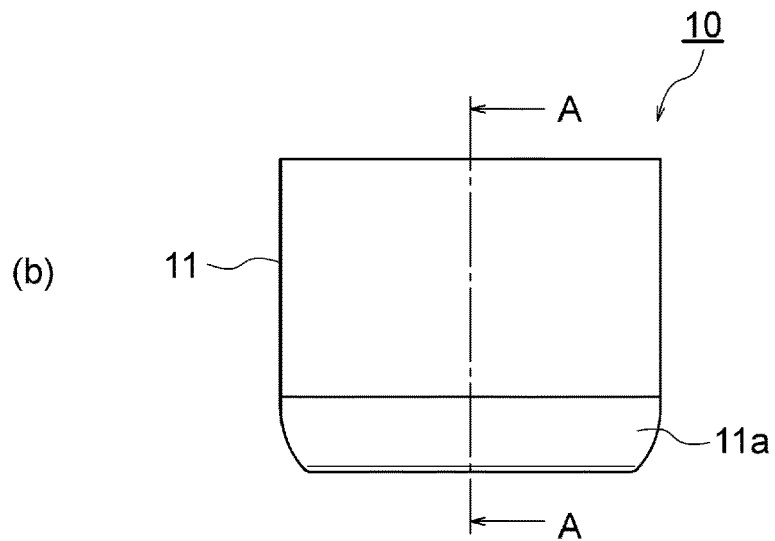
(c)
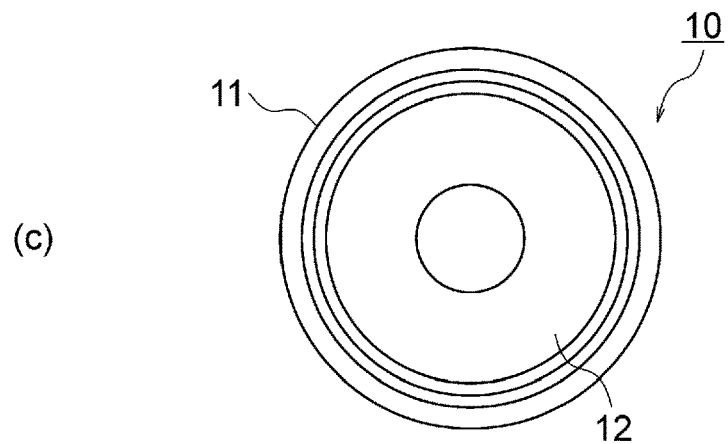

FIG. 8
(a)
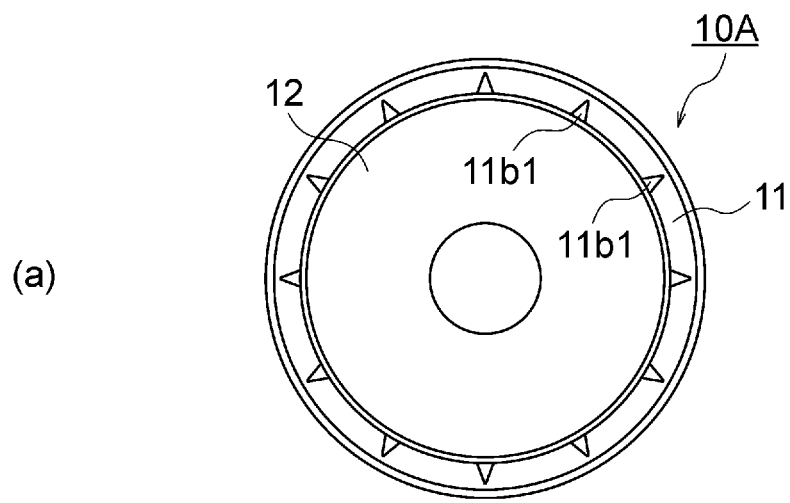
(b)
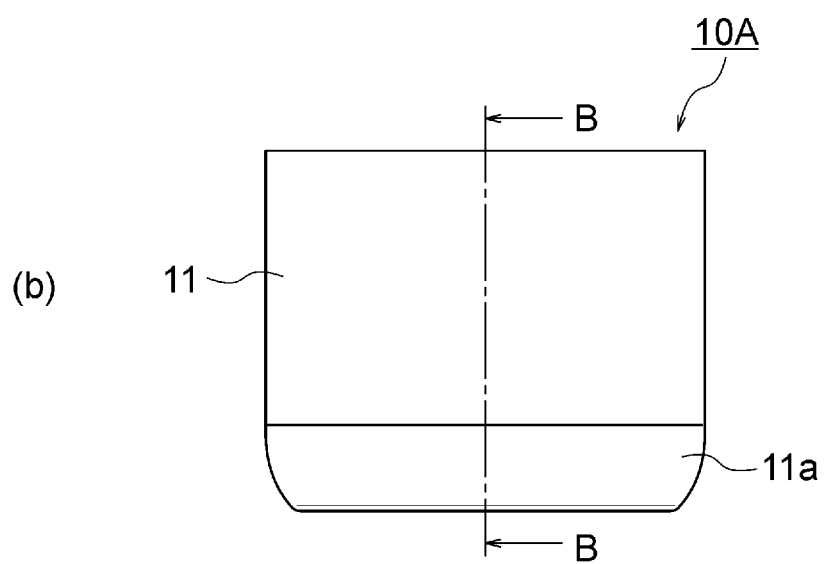

FIG. 10
(a)
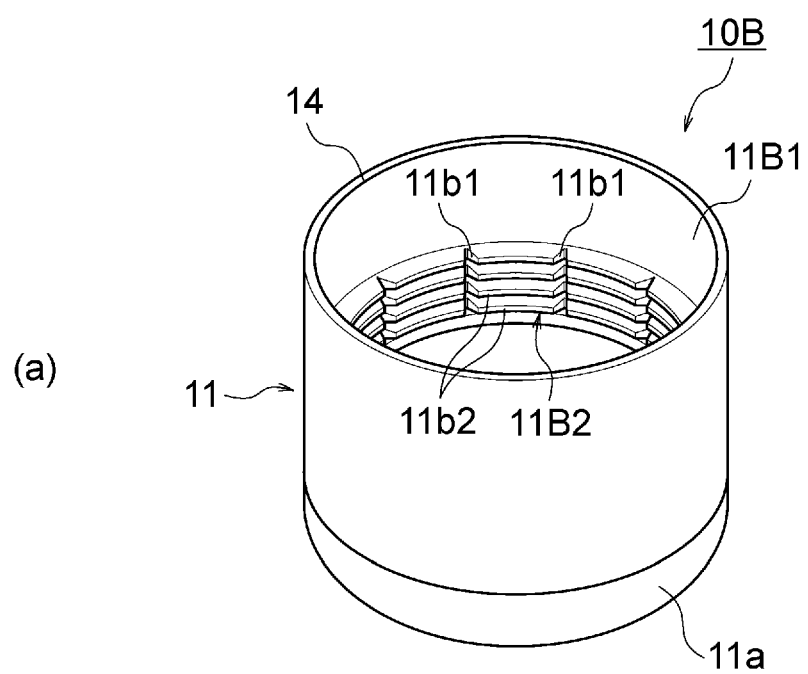
(b)
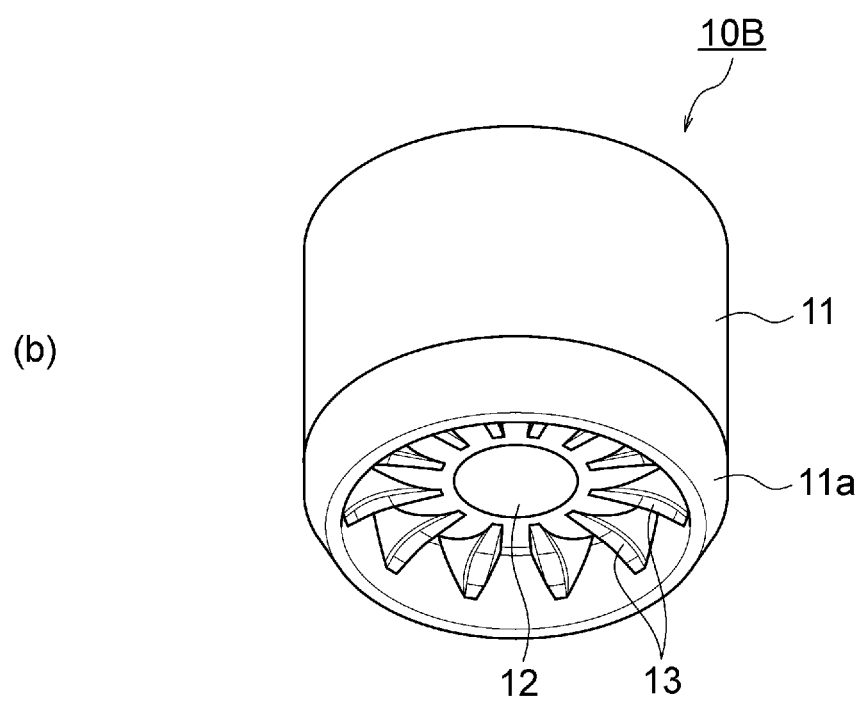

FIG. 16
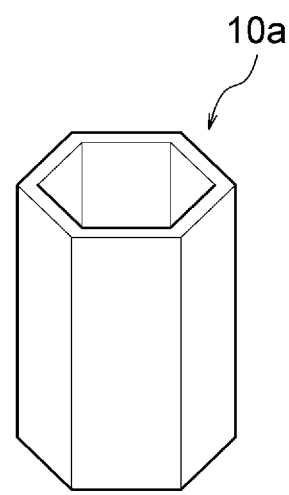
(a)
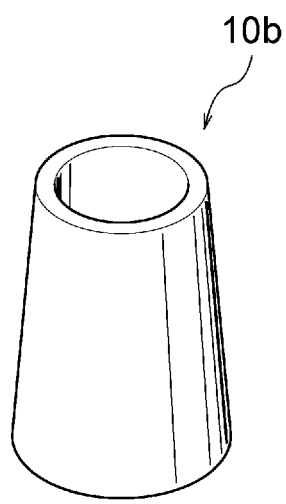
(b)
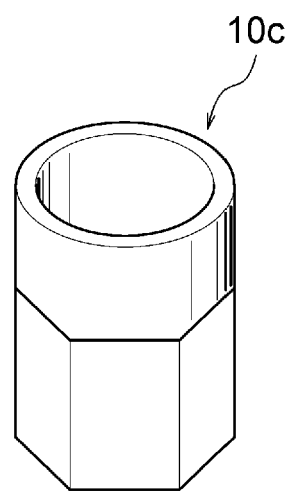
(c)
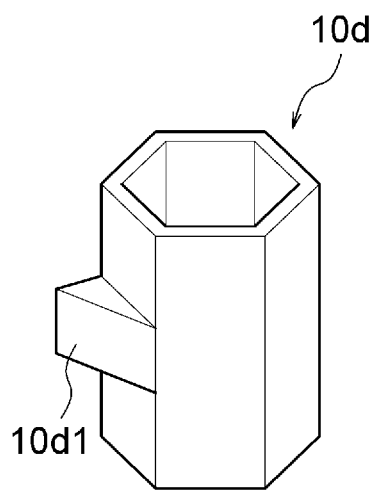
(d)
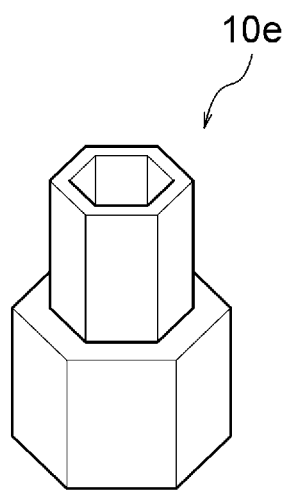
(e)
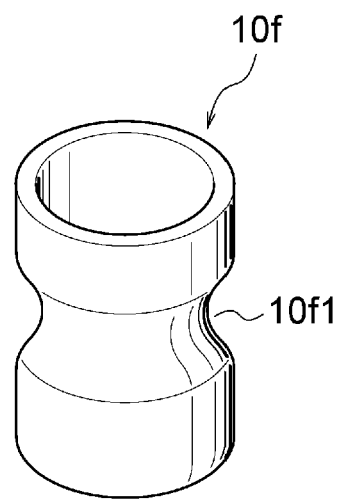
(f)

GRIPPING DEVICE AND INDUSTRIAL ROBOT

TECHNICAL FIELD

The present invention relates to a gripping device for gripping a workpiece and an industrial robot.

BACKGROUND ART

In various industrial fields, labor saving by automation has progressed, and various industrial robots for the automation have been proposed and put to practical use. Some of such industrial robots include a gripping device, and a workpiece is gripped by the gripping device and transferred to a predetermined place.

PTL 1 discloses, as a gripping device provided in an industrial robot, a gripping device that includes a palm portion and a plurality of (for example, five) finger portions protruding integrally around the palm portion. In the gripping device according to PTL 1, a sealed space formed above the palm portion is decompressed to elastically deform the palm portion in the thickness direction, and the plurality of finger portions fall toward the center of the palm portion by the elastic deformation of the palm portion, whereby the workpiece is gripped by the plurality of finger portions.

CITATION LIST

Patent Literature

PTL 1: Japanese Patent Laid-Open No. 2018-062038

SUMMARY OF THE INVENTION

Technical Problem

Since the gripping device according to PTL 1 grips a workpiece by the frictional force acting on the contact point between the finger portions and the workpiece, the workpiece may not be reliably gripped depending on the type of the workpiece. For example, workpieces having an inclined surface with a conical shape, a frustum shape, or a hemispherical shape are difficult to grip with a gripping device. In addition, workpieces having a slippery surface (with small friction coefficient) are also difficult to grip a with a gripping device.

An object of the present invention is to provide a gripping device and an industrial robot capable of reliably gripping a workpiece having a shape that is difficult to grip or a workpiece having a slippery surface.

Solution to Problem

A gripping device according to the present invention is a gripping device that grips a workpiece, the gripping device including: an elastically deformable partition film; a deformation unit that elastically deforms the partition film; and a cylindrical gripping portion that extends integrally from a peripheral edge of the partition film and is elastically deformed in a central axis direction along with elastic deformation of the partition film by the deformation unit to wrap the workpiece.

An industrial robot according to the present invention includes the gripping device.

Advantageous Effects of Invention

According to the present invention, since the partition film is elastically deformed, the gripping portion is elastically deformed (contracted) in the central axis direction, and the gripping portion uniformly abuts on the entire outer peripheral surface of the workpiece to wrap the workpiece. At this time, a pressing force acts on the workpiece from the gripping portion at a contact point between the outer peripheral surface of the workpiece and the gripping portion. As a result, a frictional force proportional to the pressing force acts between the outer peripheral surface of the workpiece and the gripping portion.

The gripping portion uniformly abuts on the entire outer peripheral surface of the workpiece to wrap the workpiece, so that a sealed space is formed among the workpiece, the gripping portion, and the partition film. Since the volume of the sealed space is increased by elastic deformation of the partition film, a negative pressure is generated in the sealed space. The workpiece is sucked by the negative pressure generated in the sealed space.

Therefore, it is possible to provide a gripping device and an industrial robot that are capable of reliably gripping a workpiece having a shape that is difficult to grip or a workpiece having a slippery surface by a frictional force acting between the outer peripheral surface of the workpiece and the gripping portion and a suction force due to a negative pressure generated in the sealed space formed among the workpiece, the gripping portion, and the partition film.

BRIEF DESCRIPTION OF DRAWINGS

FIG. 3 A diagram illustrating a gripping member in the gripping device according to the first embodiment, in which (a) of FIG. 3 is a perspective view of the gripping member as obliquely seen from above, and (b) of FIG. 3 is a perspective view of the gripping member as obliquely seen from below.

FIG. 4 A diagram illustrating the gripping member in the gripping device according to the first embodiment, in which (a) of FIG. 4 is a plan view, (b) of FIG. 4 is a front view, and (c) of FIG. 4 is a bottom view.

FIG. 8 A diagram illustrating the gripping member in the gripping device according to the second embodiment, in which (a) of FIG. 8 is a plan view and (b) of FIG. 8 is a front view.

FIG. 10 A diagram illustrating a gripping member in a gripping device according to a third embodiment, in which (a) of FIG. 10 is a perspective view of the gripping member as obliquely seen from above, and (b) of FIG. 10 is a perspective view of the gripping member as obliquely seen from below.

FIG. 16 (a) to (f) of FIG. 16 are perspective diagrams illustrating various forms of a gripping member in a gripping device according to a modification.

DESCRIPTION OF EMBODIMENTS

Figure 1:
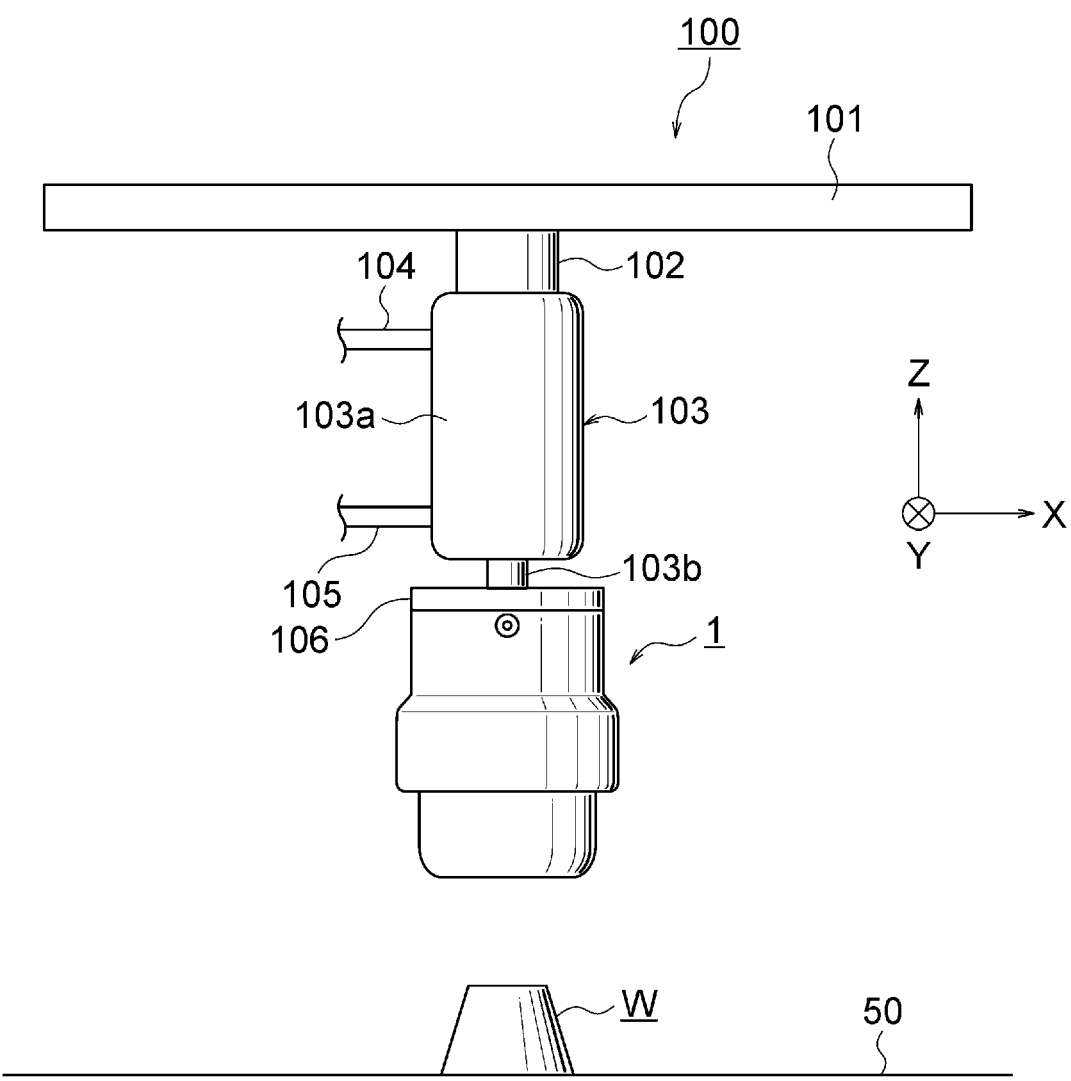
FIG. 1 A front view of an industrial robot according to a first embodiment.

Hereinafter, embodiments of the present invention will be described in detail with reference to the drawings. The embodiments described below are examples of the present invention, and the present invention is not limited thereto. In the following description of the embodiments, the same components are denoted by the same reference numerals, and the description thereof will be omitted as appropriate.

First Embodiment

[Industrial Robot]

FIG. 1 is a front view of an industrial robot 100 according to a first embodiment. The industrial robot 100 is an orthogonal robot that grips a workpiece W on a base 50 by a gripping device 1 described later, and transfers the workpiece W to a predetermined place by moving the gripping device 1 along an X-axis direction (horizontal direction), a Y-axis direction (direction perpendicular to the plane of FIG. 1), and a Z-axis direction (vertical direction) in FIG. 1. The workpiece W is formed in a truncated cone shape in FIG. 1. The industrial robot is not limited to the orthogonal robot, and may be a scalar robot, an articulated robot, or the like.

The industrial robot 100 includes a moving body 102 that is movable in the X-axis direction along a rail 101 installed horizontally with respect to the base 50, an air cylinder 103 that is fixed to a lower portion of the moving body 102, and the gripping device 1 that is fixed to a lower end of an extendable (vertically movable) piston rod 103b extending downward from the air cylinder 103. In the present embodiment, the gripping device 1 is provided in the air cylinder 103. However, the present invention is not limited thereto, and the gripping device 1 may be provided in a hydraulic cylinder.

The rail 101 is movable in the Y-axis direction in FIG. 1. Therefore, the gripping device 1 moves in the X-axis direction along with the movement of the moving body 102, moves in the Y-axis direction along with the movement of the rail 101, and moves in the Z-axis direction along with the vertical movement of the piston rod 103b of the air cylinder 103.

The air cylinder 103 includes a cylinder 103a, a piston (not illustrated) provided in the cylinder 103a so as to be capable of expansion and contraction (vertical movement), and the piston rod 103b connected to the piston. An adapter plate 106 for mounting the gripping device 1 is attached to a lower end of the piston rod 103b. The inside of the cylinder 103a is partitioned by a piston into an upper chamber and a lower chamber (both not illustrated) that are arranged vertically. The upper chamber is connected to an air pipe 104, and the lower chamber is connected to an air pipe 105. When the compressed air in the air supply source is supplied from the air pipe 104 to the upper chamber and the air in the lower chamber is discharged from the air pipe 105, the piston rod 103b and the gripping device 1 attached thereto move downward along the Z-axis direction. When the compressed air in the air supply source is supplied from the air pipe 105 to the lower chamber and the air in the upper chamber is discharged from the air pipe 104, the piston rod 103b and the gripping device 1 attached thereto move upward along the Z-axis direction.

[Gripping Device]

Figure 2:
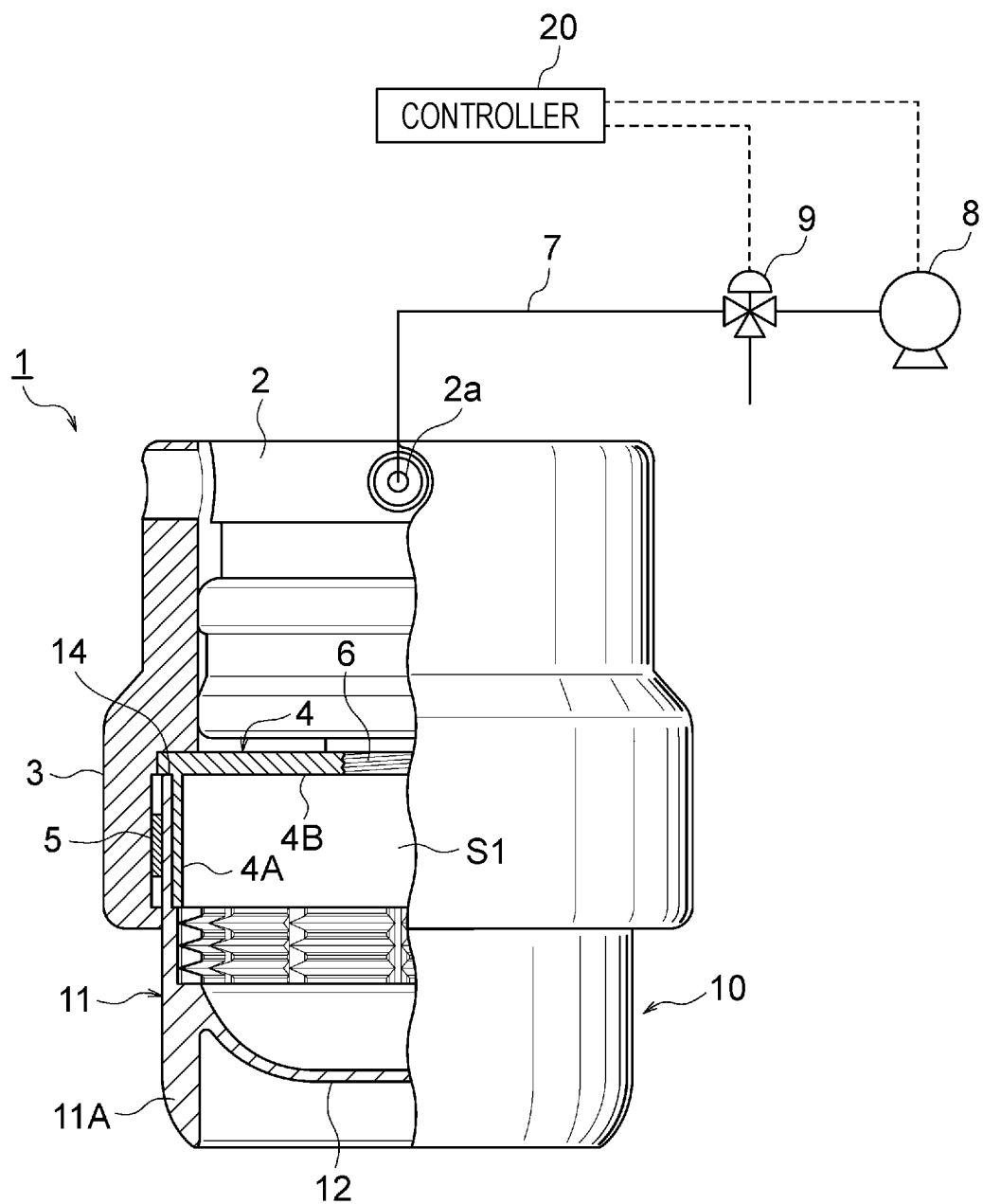
FIG. 2 A broken front view of a gripping device according to the first embodiment.

FIG. 2 is a broken front view of the gripping device 1 according to the first embodiment. The gripping device 1 is easily attached to the lower end of the piston rod 103b by one-touch operation of attaching a detachable portion 2 provided on the upper portion to the adapter plate 106 (see FIG. 1).

In the gripping device 1, the gripping member 10 is detachably attached to the lower portion of the detachable portion 2. The gripping member 10 is a cylindrical member, and has a circular cylindrical shape in the present embodiment. The gripping member 10 includes a cylindrical casing 11 and an elastically deformable thin partition film 12 that vertically partitions the inside of the casing 11, and has an opening portion 14 in the upper portion. The opening portion 14 of the gripping member 10 is closed by a bottomed cylindrical case member 4. More specifically, the cylindrical portion 4A of the case member 4 is fitted into the opening portion 14 of the gripping member 10 from above, and is inserted and fitted to the upper portion of the gripping member 10 by a band 5 wound around the outer peripheral surface of the upper portion of the gripping member 10.

A plug-shaped joint 6 is screwed to the center of a disc portion 4B of the case member 4, and the gripping member 10 is easily attached to the detachable portion 2 by one-touch operation by attaching the joint 6 to the detachable portion 2 from below.

The gripping device 1 further includes a cylindrical cover portion 3 that covers the outer periphery of the detachable portion 2, the surface of the case member 4, and the upper outer periphery of the gripping member 10. The cover portion 3 is formed of an elastic material such as resin or rubber, or a material having excellent cushioning properties such as a foam material, for example. In the gripping device 1, since the detachable portion 2, the case member 4, and the gripping member 10 are covered with the cover portion 3, the detachable portion 2 and the band 5 are not exposed, and a connection portion between the detachable portion 2 and the case member 4 and a connection portion between the case member 4 and the gripping member 10 are also not exposed. Therefore, since the gripping device 1 includes the cover portion 3, foreign matter is prevented from accumulating in the uneven portions between the detachable portion 2 or the band 5, the connection portion between the detachable portion 2 and the case member 4, the connection portion between the case member 4 and the gripping member 10, and the like. In the present embodiment, the cover portion 3 is used. However, the present invention is not limited thereto, and the cover portion 3 may not be used.

Details of the configuration of the gripping member 10 will be described below with reference to FIGS. 3 to 5.

(a) of FIG. 3 is a perspective view of the gripping member 10 of the gripping device 1 according to the first embodiment as obliquely seen from above. (b) of FIG. 3 is a perspective view of the gripping member 10 as obliquely seen from below. (a) of FIG. 4 is a plan view of the gripping member 10. (b) of FIG. 4 is a front view of the gripping member 10. (c) of FIG. 4 is a bottom view of the gripping member 10. FIG. 5 is a cross-sectional view taken along line A-A in (b) of FIG. 4.

As described above, the gripping member 10 includes the casing 11 and the partition film 12. In the casing 11, a lower part in a skirt shape partitioned by the partition film 12 constitutes a gripping portion 11A that integrally extends downward from a peripheral edge of the partition film 12. When the partition film 12 elastically deforms, the gripping portion 11A elastically deforms (decreases in diameter) in a central axis CL direction (see FIG. 5) along with the elastic deformation of the partition film 12 and grips the workpiece W so as to wrap the workpiece W from the periphery thereof. The gripping portion 11A is formed in a tapered shape such that the thickness becomes smaller downward. That is, the outer peripheral surface of the lower half of the gripping portion 11A forms a convex arcuate curved surface 11a so as to decrease in diameter downward.

A cylindrical upper portion of the casing 11 partitioned by the partition film 12 constitutes a connecting portion 11B that connects the gripping member 10 to the case member 4. The connecting portion 11B includes a swage portion 11B1 that is swaged by the band 5 to the outer periphery of the cylindrical portion 4A of the case member 4, and a deformation portion 11B2 that is formed at a boundary portion between the swage portion 11B1 and the gripping portion 11A. That is, the deformation portion 11B2 is provided at a boundary portion of the connecting portion 11B with the gripping portion 11A. The thickness of the deformation portion 11B2 is set to be larger than the thickness of the swage portion 11B1. The thickness of the gripping portion 11A is set to be larger than the thickness of the deformation portion 11B2.

The deformation portion 11B2 serves as a starting point of elastic deformation of the gripping portion 11A. In the present embodiment, as illustrated in (a) of FIG. 3, (a) of FIG. 4, and FIG. 5, the deformation portion 11B2 includes a plurality of (in the illustrated example, 12) vertical slits 11b1 that is provided at equal angular pitches (30° pitches) along the circumferential direction, and multistage grooves in which a plurality of (in the illustrated example, 3) grooves 11b2 that is provided along the circumferential direction and is arranged (in 3 stages) in the vertical direction. The grooves 11b2 are formed in a V shape. In the present embodiment, the number of the slits 11b1 constituting the deformation portion 11B2 is set to 12, and the number of the stages of the grooves 11b2 constituting the multistage grooves is set to 3, but these numbers can be arbitrarily set as necessary.

In the present embodiment, the casing 11 and the partition film 12 are integrally formed of an elastically deformable flexible material, for example, urethane, nylon, silicone resin, or the like. The casing 11 and the partition film 12 are not necessarily made of the same material, and the casing 11 and the partition film 12 may be integrally formed of different materials different in hardness, for example. The casing 11 and the partition film 12 are not necessarily integrated, and may be configured separately as long as they are joined and integrated.

Figure 5:
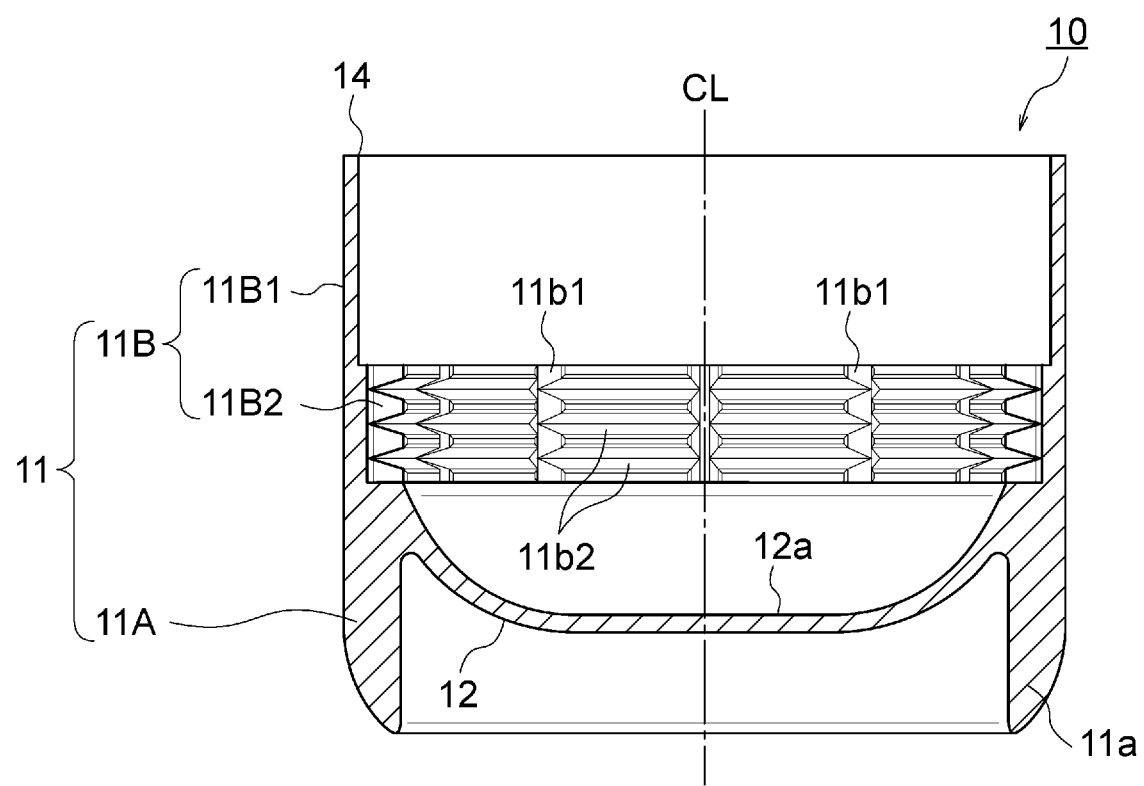
FIG. 5 A cross-sectional view taken along line A-A in (b) of FIG. 4.

As illustrated in FIG. 5, the partition film 12 is configured as a concave curved surface that bulges downward. A flat surface 12a at the central portion of the partition film 12 is formed on the same plane as the plane formed in the radial direction. That is, in the present embodiment, the partition film 12 is provided integrally with the casing 11 and on the same plane as the plane formed in the radial direction.

In the gripping device 1, as illustrated in FIG. 2, a sealed space S1 is defined by the case member 4, the casing 11, and the partition film 12 in an upper portion of the gripping member 10. An air supply/exhaust port 2a is formed on an upper outer periphery of the detachable portion 2. The air supply/exhaust port 2a communicates with the inside of the detachable portion 2 and the sealed space S1 via the joint 6. One end of a pipe 7 is connected to the air supply/exhaust port 2a. A vacuum pump 8 as a deformation unit that elastically deforms the partition film 12 is connected to the other end of the pipe 7. An electric three-way valve 9 is connected to the middle of the pipe 7. The three-way valve 9 and the vacuum pump 8 are electrically connected to a controller 20 as a control unit.

The three-way valve 9 is switched to connect the sealed space S1 to the vacuum pump 8 or open the sealed space S1 to the atmosphere. The switching of the three-way valve 9 is controlled by controller 20. The driving of the vacuum pump 8 is also controlled by the controller 20.

Switching the three-way valve 9 connects the vacuum pump 8 to the sealed space S1, and driving the vacuum pump 8 evacuates the sealed space S1, decompresses the sealed space S1, and elastically deforms the partition film 12. In the present embodiment, the vacuum pump 8 is used as the deformation unit, but the present invention is not limited to this. As the deformation unit, a vacuum generator different from the vacuum pump 8, for example, a vacuum ejector or a vacuum blower may be used. As the deformation unit, a syringe barrel having a syringe and a plunger movable in the syringe in the axial direction may be used. When the vacuum generator is connected to the sealed space S1 to evacuate the sealed space S1, the sealed space S1 is decompressed and the partition film 12 is elastically deformed.

Next, the operations of the gripping device 1 configured as described above will be described below with reference to FIG. 6.

Figure 6:
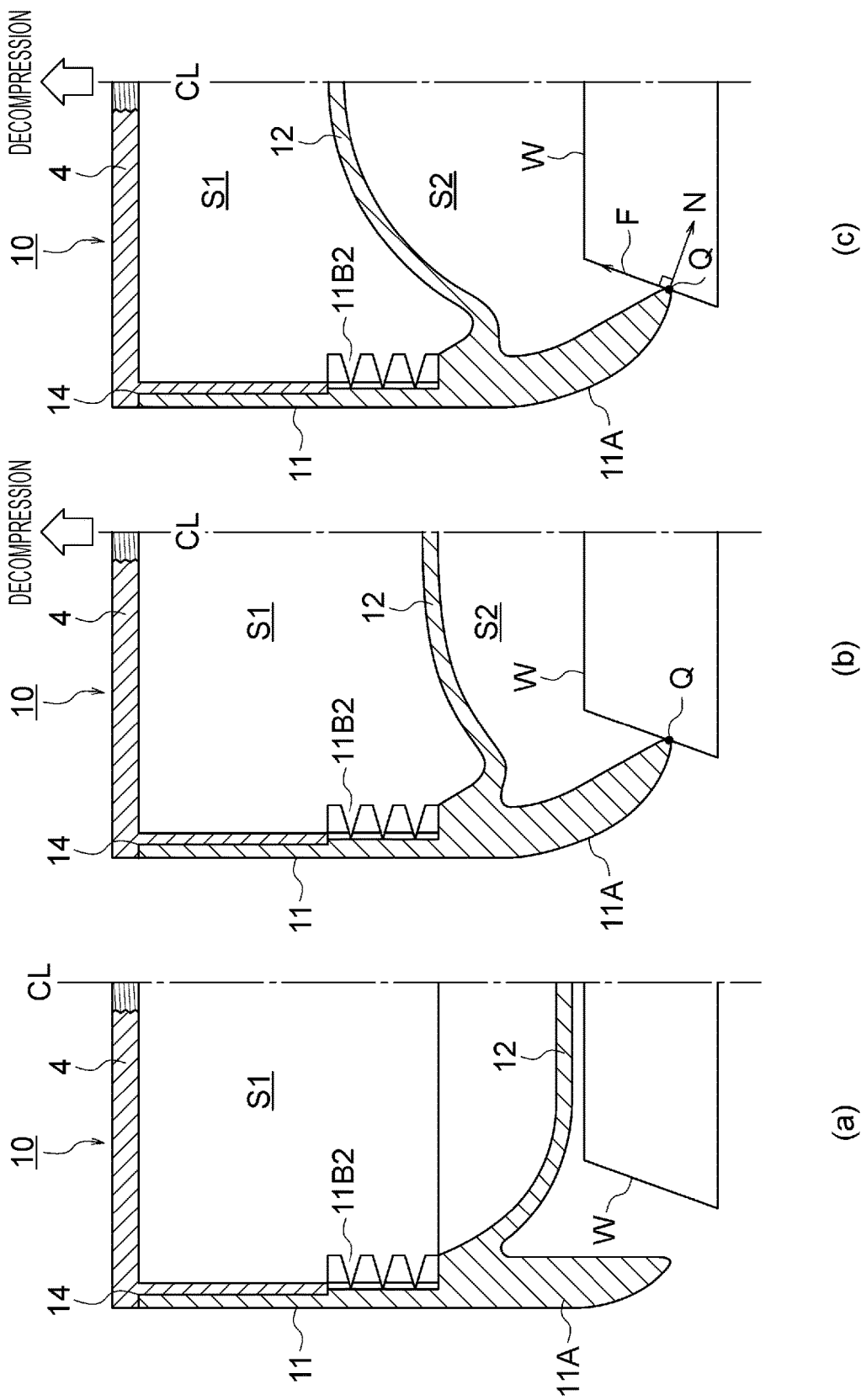
FIG. 6 (a) to (c) of FIG. 6 are half-cut cross-sectional diagrams illustrating the action of the gripping device according to the first embodiment.

(a) to (c) of FIG. 6 are half-cut cross-sectional diagrams illustrating the action of the gripping device 1. Hereinafter, a case of gripping a truncated cone-shaped workpiece W that is difficult to grip by the gripping device 1 will be described.

After the moving body 102 of the industrial robot 100 illustrated in FIG. 1 is moved above the workpiece W, the air cylinder 103 is driven to lower the piston rod 103b together with the gripping device 1, and the gripping portion 11A of the gripping device 1 is positioned around the workpiece Was illustrated in (a) of FIG. 6.

When the three-way valve 9 is switched in response to a command from the controller 20 from the state illustrated in (a) of FIG. 6 to connect the vacuum pump 8 as a deformation unit to the sealed space S1. When the vacuum pump 8 is driven, the sealed space S1 is evacuated and the sealed space S1 is decompressed. When the sealed space S1 is decompressed as described above, as illustrated in (b) of FIG. 6, the partition film 12 is pulled upward and elastically deformed (expanded). The vacuum pump 8 functions as a deformation unit that elastically deforms the partition film 12. Along with the elastic deformation of the partition film 12, the cylindrical gripping portion 11A is elastically deformed and reduced in diameter in the central axis CL direction with the deformation portion 11B2 as a starting point, and the inner surface of the tip of the gripping portion 11A comes into contact with the outer peripheral surface of the workpiece W. As a result, a sealed space S2 is formed among the workpiece W, the gripping portion 11A, and the partition film 12.

At this time, the internal pressure of the sealed space S2 is maintained at atmospheric pressure. A point at which the inner surface of the tip of the gripping portion 11A is in contact with the outer peripheral surface of the workpiece W will be defined as a contact point Q.

When the sealed space S2 is further decompressed by the vacuum pump 8 from the state illustrated in (b) of FIG. 6, as illustrated in (c) of FIG. 6, the partition film 12 is further elastically deformed (expanded) more largely. Accordingly, the gripping portion 11A is about to further elastically deform (decrease in diameter) in the central axis CL direction. Therefore, a pressing force N (N is a total force that takes on a value obtained by integrating pressing forces in the circumferential direction) acts on the workpiece W from the gripping portion 11A at the contact point Q. For this reason, a frictional force F acts on the contact point Q in the arrow direction in the drawing.

When the partition film 12 is further elastically deformed (expanded) from the state illustrated in (b) of FIG. 6 to the state illustrated in (c) of FIG. 6, the volume of the sealed space S2 increases.

Therefore, in the state illustrated in (c) of FIG. 6, the internal pressure of the sealed space S2 becomes a negative pressure, a pressure difference (differential pressure) is generated above and below the workpiece W, and an upward suction force based on the differential pressure acts on the workpiece W.

As described above, the gripping device 1 according to the first embodiment includes the partition film 12 that is elastically deformable, the vacuum pump 8 as a deformation unit that elastically deforms the partition film 12, and the cylindrical gripping portion 11A that extends integrally from the peripheral edge of the partition film 12 and is elastically deformed in the central axis direction along with the elastic deformation of the partition film 12 by the vacuum pump 8 to wrap the workpiece W. According to the gripping device 1, when the partition film 12 is elastically deformed, the gripping portion 11A is elastically deformed (contracted) in the central axis CL direction and uniformly abuts on the entire outer peripheral surface of the workpiece W. Accordingly, the gripping portion 11A wraps the workpiece W from the periphery thereof. At this time, the pressing force N acts on the workpiece W from the gripping portion 11A at the contact point Q between the gripping portion 11A and the workpiece W, and the frictional force F proportional to the pressing force N acts between the gripping portion 11A and the workpiece W.

Since the gripping portion 11A uniformly abuts on the entire outer peripheral surface of the workpiece W, the sealed space S2 is formed among the workpiece W, the gripping portion 11A, and the partition film 12. Since the volume of the sealed space S2 increases due to the elastic deformation of the partition film 12, a negative pressure is generated in the sealed space S2. When the negative pressure is generated in the sealed space S2, a pressure difference (differential pressure) is generated above and below the workpiece W. Therefore, the workpiece W is sucked by the suction force due to the negative pressure generated in the sealed space S2.

Therefore, the workpiece W is gripped by both the vertical component of the frictional force F acting on the contact point Q between the outer peripheral surface of the workpiece W and the gripping portion 11A and the suction force due to the negative pressure generated in the sealed space S2. Therefore, the gripping device 1 can reliably grip the truncated cone-shaped workpiece W that is difficult to grip.

Then, according to the industrial robot 100 including the gripping device 1 illustrated in FIG. 1, it is possible to reliably grip the truncated cone-shaped workpiece W that is difficult to grip and transfer the workpiece W to a predetermined place.

That is, upon receiving a signal indicating that the workpiece W has been gripped by the gripping device 1 from a sensor (not illustrated) or the like, the controller 20 illustrated in FIG. 2 supplies the compressed air from the air pipe 105 to the lower chamber in the cylinder 103a of the air cylinder 103 illustrated in FIG. 1 and discharges the air in the upper chamber from the air pipe 104. The piston rod 103b of the air cylinder 103 moves upward together with the gripping device 1, and the workpiece W is lifted up to a predetermined height position in a state of being gripped by the gripping device 1. The controller 20 drives a driving device (not illustrated) to move the moving body 102 in the X-axis direction along the rail 101, and moves the rail 101 in the Y-axis direction to transfer the workpiece W gripped by the gripping device 1 to a predetermined position in the X-Y plane.

Upon receiving a signal indicating that the workpiece W has been transferred to a predetermined position from a sensor (not illustrated) or the like, the controller 20 supplies the compressed air from the air pipe 104 to the upper chamber in the cylinder 103a of the air cylinder 103, and discharges the air in the lower chamber from the air pipe 105. The piston rod 103b of the air cylinder 103 moves downward together with the gripping device 1 and the workpiece W gripped by the gripping device 1, thereby to place the workpiece W at a predetermined position.

Upon receiving a signal indicating that the workpiece W is placed at a predetermined position from a sensor (not illustrated) or the like, the controller 20 switches the three-way valve 9 to open the sealed space S1 to the atmosphere. Outside air is introduced into the sealed space S1 from the pipe 7, and the internal pressure of the sealed space S1 becomes equal to the atmospheric pressure.

When the internal pressure of the sealed space S1 becomes equal to the atmospheric pressure, in the gripping member 10 of the gripping device 1, the partition film 12 returns to the initial state illustrated in FIG. 5 by its own elastic restoring force. Accordingly, the gripping portion 11A also returns to the original state illustrated in FIG. 5, and as illustrated in (a) of FIG. 6, the workpiece W is separated from the gripping portion 11A and accurately positioned and placed at a predetermined position.

The series of operations described above is continuously repeated by the industrial robot 100, whereby the plurality of workpieces W is gripped by the gripping device 1 and automatically transferred to a predetermined position, and manual work is omitted, and labor saving and high efficiency are achieved.

In the present embodiment, the truncated cone-shaped workpiece W that is difficult to grip is gripped by the gripping device 1 as an example. The gripping device 1 can also reliably grip a conical or hemispherical workpiece that is difficult to grip or a workpiece with a slippery surface.

In the gripping device 1, since the sealed space S1 to be evacuated and the workpiece W are partitioned by the partition film 12, in a case where the workpiece W is a food, for example, there occurs no problem that a part of the food is sucked into the pipe 7 to clog the pipe 7 or the clogging food becomes spoiled.

The gripping device 1 can easily adjust the gripping force only by adjusting the amount of elastic deformation of the partition film 12, that is, the degree of decompression (degree of vacuum) of the sealed space S1. Thus, the gripping device 1 can always reliably grip the workpiece W.

In the initial state illustrated in FIG. 5 (state where the sealed space S1 is not evacuated), the central portion of the partition film 12 has an arcuate curved shape that bulges downward. For this reason, in the gripping device 1, the amount of elastic deformation (amount of expansion) of the partition film 12 increases with the sealed space S1 decompressed, the values of the amount of elastic deformation of the gripping portion 11A due to the elastic deformation of the partition film 12 and the negative pressure generated in the sealed space S2 increase, and the workpiece W can be gripped more effectively by the gripping portion 11A.

The partition film 12 may have a bellows shape or a stepped shape so that the partition film 12 is easily elastically deformed. Alternatively, a jig (for example, a jig such as an umbrella bone) serving as a guide for elastic deformation may be attached to the partition film 12.

A sealing mechanism (for example, flexible O-rings, bellows, and the like.) for enhancing sealing performance with respect to the workpiece W may be provided at a contact portion of the gripping portion 11A with the workpiece W.

Second Embodiment

Figure 9:
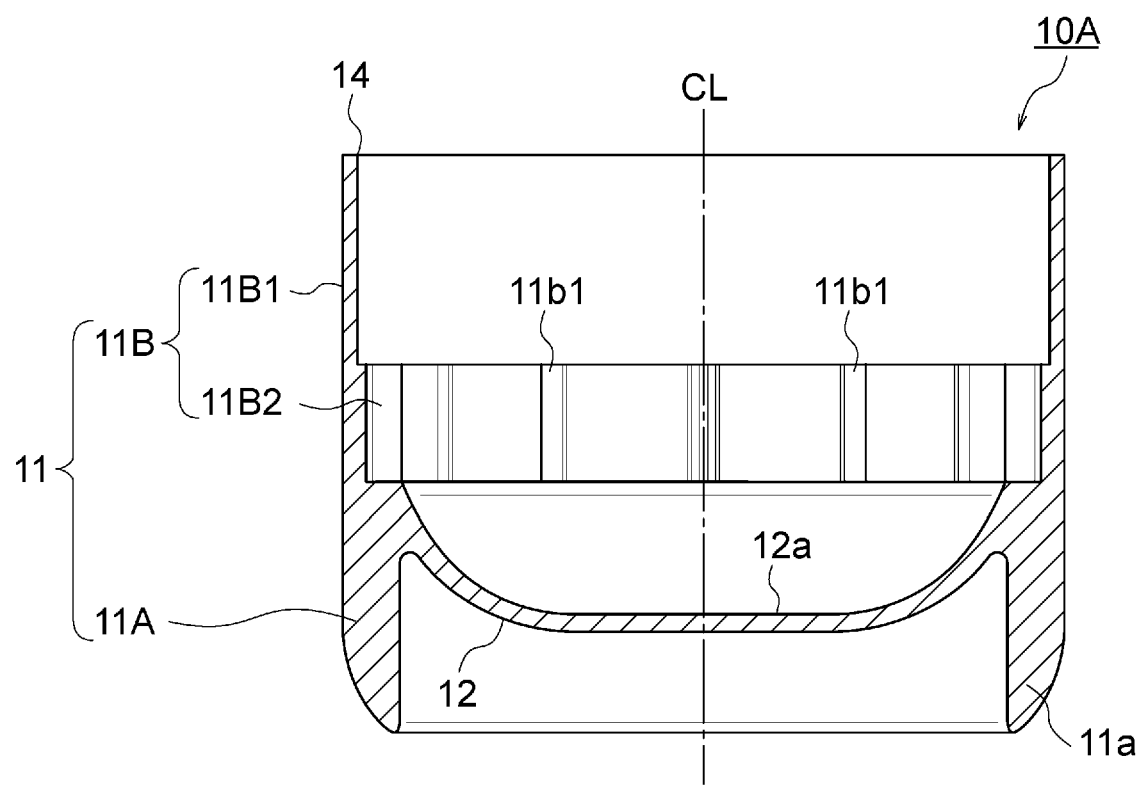
FIG. 9 A cross-sectional view taken along line B-B in (b) of FIG. 8.

Next, a configuration of a gripping member of a gripping device according to a second embodiment will be described below with reference to FIGS. 7 to 9. The gripping device according to the second embodiment includes a gripping member 10A instead of the gripping member 10 of the gripping device 1 according to the first embodiment.

Figure 7:
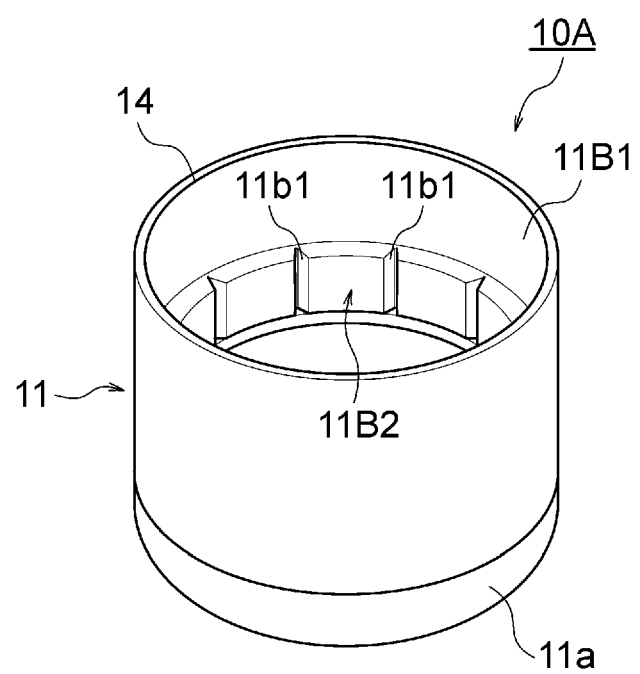
FIG. 7 A perspective view of a gripping member in a gripping device according to a second embodiment as obliquely seen from above.

FIG. 7 is a perspective view of the gripping member 10A of the gripping device according to the second embodiment as obliquely seen from above. (a) of FIG. 8 is a plan view of the gripping member 10A. (b) of FIG. 8 is a front view of the gripping member 10A. FIG. 9 is a cross-sectional view taken along line B-B of (b) of FIG. 8. In these drawings, the same elements as those illustrated in FIGS. 2 to 5 are denoted by the same reference numerals, and the description thereof will be omitted below.

In the gripping member 10A according to the second embodiment, as illustrated in FIGS. 7, (a) of 8, and 9, a deformation portion 11B2 is constituted by a plurality of (in the illustrated example, 12) vertical slits 11b1 formed at an equiangular pitch (30° pitch) in the circumferential direction, and the other configuration is the same as the configuration of the gripping member 10 according to the first embodiment.

In the gripping device according to the second embodiment including the gripping member 10A, similarly, when a gripping portion 11A is elastically deformed with a deformation portion 11B2 as a starting point along with the elastic deformation of a partition film 12 and wraps a workpiece W from the periphery thereof, the same advantageous effect as that of the gripping device 1 according to the first embodiment can be obtained that the workpiece W can be reliably gripped by the frictional force acting on the contact point between the outer peripheral surface of the workpiece W and the gripping portion 11A and the suction force due to the difference in pressure (differential pressure) acting on the upper and lower sides of the workpiece W along with the elastic deformation of the gripping portion 11A.

In an industrial robot including the gripping device according to the second embodiment, the same advantageous effect as that of the industrial robot 100 including the gripping device 1 according to the first embodiment can be obtained that the truncated cone-shaped workpiece W difficult to grip can be reliably gripped and transferred to a predetermined place.

In the second embodiment, the number of the slits 11b1 constituting the deformation portion 11B2 is 12. However, the number of the slits 11b1 can be arbitrarily set as necessary.

Third Embodiment

Next, a configuration of a gripping member of a gripping device according to a third embodiment will be described below with reference to FIGS. 10 to 12. The gripping device according to the third embodiment includes a gripping member 10B instead of the gripping member 10 of the gripping device 1 according to the first embodiment.

(a) of FIG. 10 is a perspective view of the gripping member 10B of the gripping device 1 according to the third embodiment as obliquely seen from above. (b) of FIG. 10 is a perspective view of the gripping member 10B as obliquely seen from below. (a) of FIG. 11 is a plan view of the gripping member 10B. (b) of FIG. 11 is a front view of the gripping member 10B. (c) of FIG. 11 is a bottom view of the gripping member 10B. FIG. 12 is a cross-sectional view taken along line C-C in (b) of FIG. 11. In these drawings, the same elements as those illustrated in FIGS. 2 to 5 are denoted by the same reference numerals, and the description thereof will be omitted below.

Figure 11:
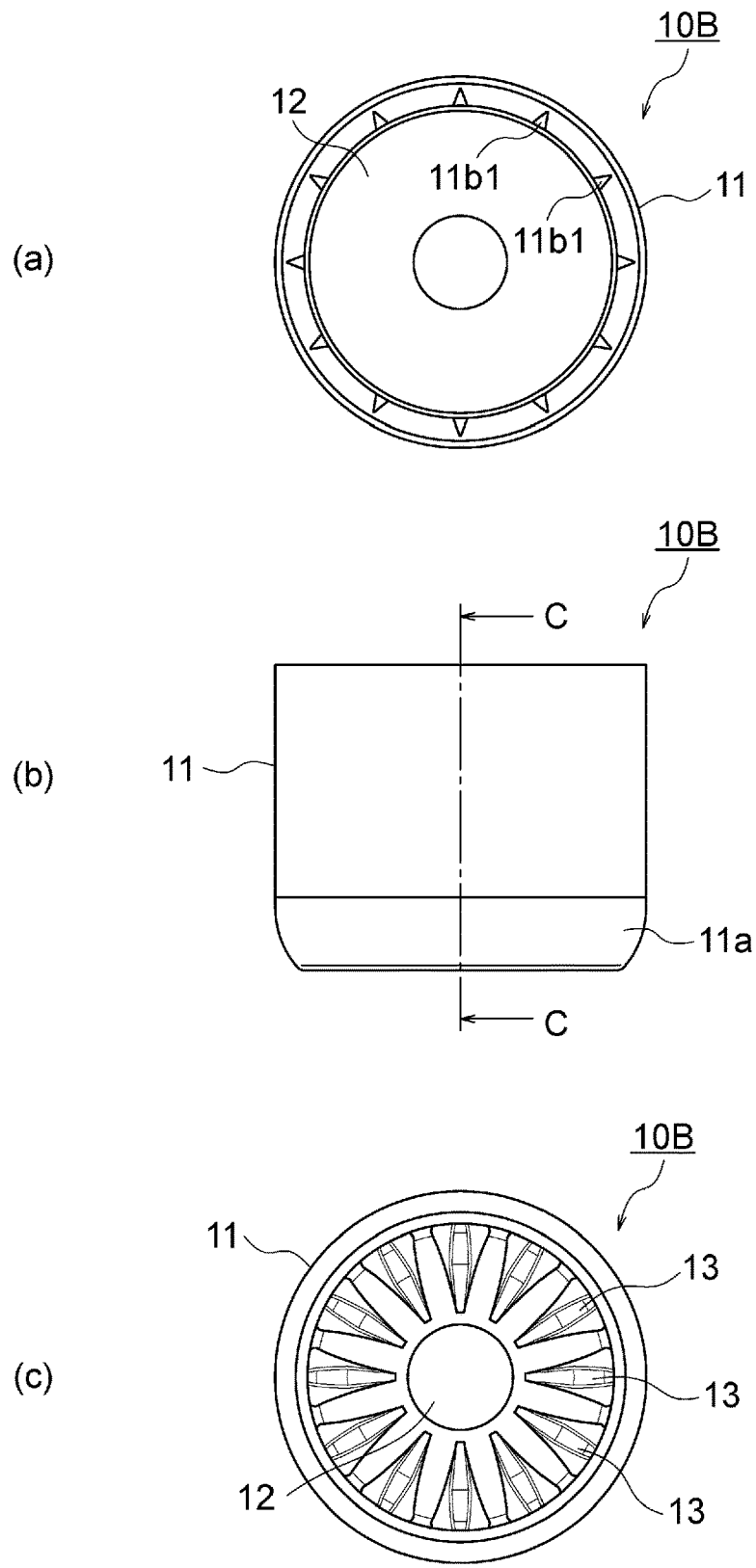
FIG. 11 A diagram illustrating the gripping member in the gripping device according to the third embodiment, in which (a) of FIG. 11 is a plan view, (b) of FIG. 11 is a front view, and (c) of FIG. 11 is a bottom view.
Figure 12:
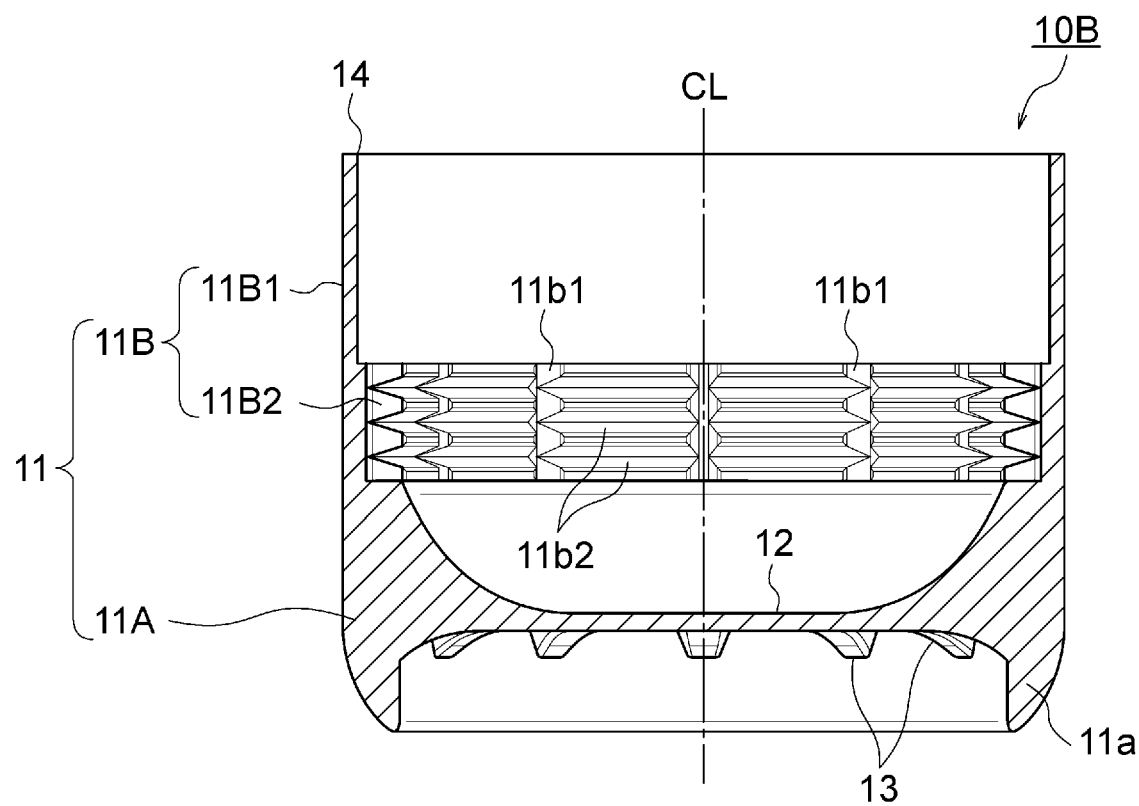
FIG. 12 A cross-sectional view taken along line C-C in (b) of FIG. 11.

In the gripping member 10B according to the third embodiment, as shown in (b) of FIGS. 10, (c) of FIG. 11, and FIG. 12, a plurality of (in the illustrated example, 12) ribs 13 having a triangular shape in a side view is integrally provided at an equiangular pitch (30° pitch) along the circumferential direction between the peripheral edge of the lower surface of a partition film 12 and the inner peripheral surface of a gripping portion 11A, and the other configuration is the same as the configuration of the gripping member 10 according to the first embodiment.

In the gripping device according to the third embodiment including the gripping member 10B, similarly, when a gripping portion 11A is elastically deformed with a deformation portion 11B2 as a starting point along with the elastic deformation of a partition film 12 and wraps a workpiece W from the periphery thereof, the same advantageous effect as that of the gripping device 1 according to the first embodiment can be obtained that the workpiece W can be reliably gripped by the frictional force acting on the contact point between the outer peripheral surface of the workpiece W and the gripping portion 11A and the suction force due to the difference in pressure (differential pressure) acting on the upper and lower sides of the workpiece W along with the elastic deformation of the gripping portion 11A.

In the third embodiment, since the plurality of (in the illustrated example, 12) ribs 13 having a triangular shape in a side view is integrally provided at an equiangular pitch (30° pitch) along the circumferential direction between the peripheral edge of the lower surface of the partition film 12 and the inner peripheral surface of the gripping portion 11A, the force generated along with the elastic deformation of the partition film 12 uniformly acts on the gripping portion 11A in the circumferential direction via the plurality of ribs 13, and this force assists the elastic deformation (diameter reduction) of the gripping portion 11A in the direction (central axis CL direction) of gripping the workpiece W. This makes it possible to obtain an advantageous effect that the workpiece W can be more reliably gripped by the gripping portion 11A.

In an industrial robot including the gripping device according to the third embodiment, the same advantageous effect as that of the industrial robot 100 including the gripping device 1 according to the first embodiment can be obtained that the truncated cone-shaped workpiece W difficult to grip can be reliably gripped and transferred to a predetermined place.

In the third embodiment, the number of ribs 13 is 12, but this number can be arbitrarily set as necessary.

Fourth Embodiment

Next, a configuration of a gripping member of a gripping device according to a fourth embodiment will be described below with reference to FIGS. 13 to 15. The gripping device according to the fourth embodiment includes a gripping member 10C instead of the gripping member 10 of the gripping device 1 according to the first embodiment.

Figure 13:
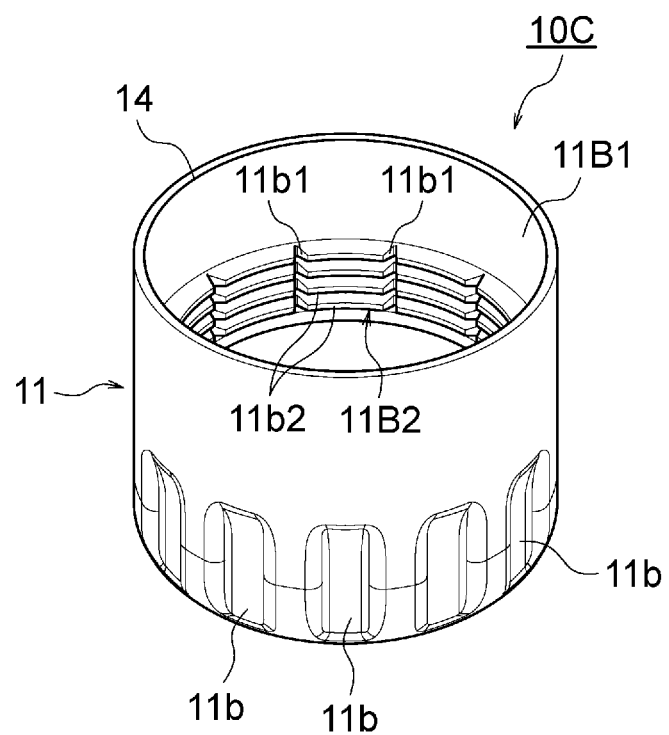
FIG. 13 A perspective view of a gripping member in a gripping device according to a fourth embodiment as obliquely seen from above.

FIG. 13 is a perspective view of the gripping member 10C in the gripping device according to the fourth embodiment as obliquely seen from above. (a) of FIG. 14 is a plan view of the gripping member 10C. (b) of FIG. 14 is a front view of the gripping member 10C. (c) of FIG. 14 is a bottom view of the gripping member 10C. FIG. 15 is a cross-sectional view taken along line D-D in (c) of FIG. 14. In these drawings, the same elements as those illustrated in FIGS. 2 to 5 are denoted by the same reference numerals, and the description thereof will be omitted below.

Figure 14:
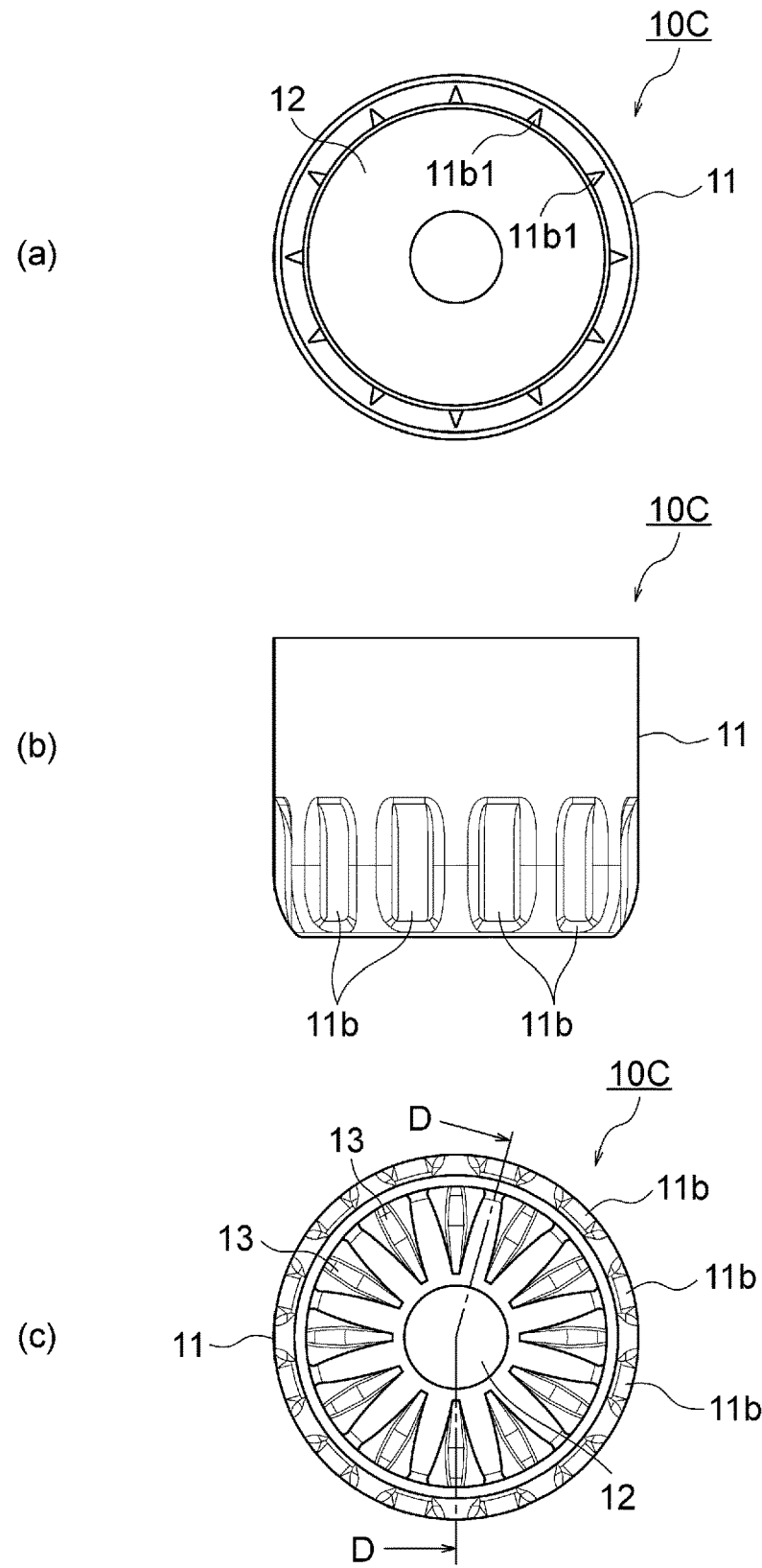
FIG. 14 A diagram illustrating the gripping member in the gripping device according to the fourth embodiment, in which (a) of FIG. 14 is a plan view, (b) of FIG. 14 is a front view, and (c) of FIG. 14 is a bottom view.
Figure 15:
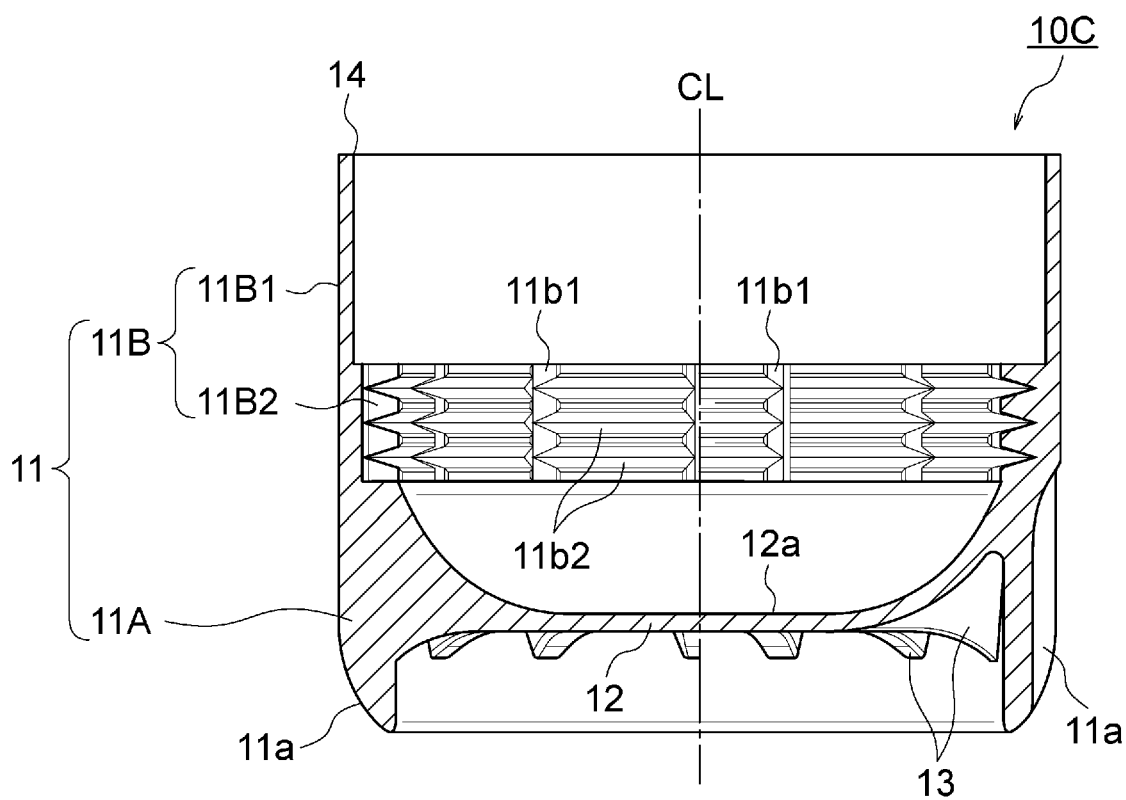
FIG. 15 A cross-sectional view taken along line D-D in (c) of FIG. 14.

In the gripping member 10C according to the fourth embodiment, as illustrated in FIG. 13, (b) and (c) of FIG. 14, and FIG. 15, a plurality of (in the illustrated example, 12) thin portions 11b is provided on the outer periphery of a gripping portion 11A at an equiangular pitch (30° pitch) in the circumferential direction, and the other configurations are the same as those of the gripping member 10B according to the third embodiment.

In the gripping device according to the fourth embodiment including the gripping member 10C, similarly, when a gripping portion 11A is elastically deformed with a deformation portion 11B2 as a starting point along with the elastic deformation of a partition film 12 and wraps a workpiece W from the periphery thereof, the same advantageous effect as that of the gripping device 1 according to the first embodiment can be obtained that the workpiece W can be reliably gripped by the frictional force acting on the contact point between the outer peripheral surface of the workpiece W and the gripping portion 11A and the suction force due to the difference in pressure (differential pressure) acting on the upper and lower sides of the workpiece W along with the elastic deformation of the gripping portion 11A.

In the fourth embodiment, since the plurality of (in the illustrated example, 12) thin portions 11b is provided on the outer periphery of the gripping portion 11A at equal angular pitches (30° pitches) in the circumferential direction, the rigidity of the entire gripping portion 11A is lowered by the plurality of thin portions 11b, and thus the gripping portion 11A is easily elastically deformed. As a result, it is possible to obtain an advantageous effect that the workpiece W can be more reliably gripped by the gripping portion 11A.

In an industrial robot including the gripping device according to the fourth embodiment, the same advantageous effect as that of the industrial robot 100 including the gripping device 1 according to the first embodiment can be obtained that the truncated cone-shaped workpiece W difficult to grip can be reliably gripped and transferred to a predetermined place.

In the fourth embodiment, the number of thin portions 11b is 12, but this number can be arbitrarily set as necessary.

<Modifications>

In the first to fourth embodiments described above, cylindrical gripping members are used as the gripping members 10, 10A, 10B, and 10C. Alternatively, gripping members having various shapes as illustrated in (a) to (f) of FIG. 16 can be used, for example.

(a) to (f) of FIG. 16 are perspective diagrams illustrating various forms of a gripping member in a gripping device according to a modification. (a) of FIG. 16 is a perspective view of a gripping member 10a according to a modification 1. The gripping member 10a is formed in a hexagonal tubular shape. (b) of FIG. 16 is a perspective view of a gripping member 10b according to a modification 2. The gripping member 10b is formed in a tapered cylindrical shape. (c) of FIG. 16 is a perspective view of a gripping member 10c according to a modification 3. The gripping member 10c has a configuration in which a cylinder and a hexagonal cylinder are vertically combined. (d) of FIG. 16 is a perspective view of a gripping member 10d according to a modification 4. The gripping member 10d has a configuration in which a projection 10d1 is provided in a protruding manner on a part of an outer surface of a hexagonal cylinder. The projection 10d1 may be used to attach a sensor or the like. (e) of FIG. 16 is a perspective view of a gripping member 10e according to a modification 5. The gripping member 10e has a configuration in which large and small hexagonal cylinders are vertically combined. (f) of FIG. 16 is a perspective view of a gripping member 10f according to a modification 6. The gripping member 10f has a configuration in which a recess 10f1 is formed at intermediate portion of a cylinder as seen in a height direction. These are merely examples, and any other shape can be used as the gripping member.

In the gripping device according to the present invention, a limiter for suppressing elastic deformation of the partition film 12 may be provided (refer to Japanese Patent Application Laid-Open No. 2019-188577, for example).

In the above embodiment, the method of decompressing the sealed space S1 using the vacuum pump 8 (vacuum generator) is used as the deformation unit for elastically deforming the partition film 12. Alternatively, the deformation unit may be a unit for mechanically deforming the partition film 12.

The present invention is not limited to the embodiments and the modifications described above, and various modifications can be made within the scope of the technical idea described in the claims, the specification, and the drawings.

REFERENCE SIGNS LIST

1: Gripping device
4: Case member
7: Pipe
8: Vacuum pump (deformation unit)
9: Three-way valve
10: Gripping member
11: Casing
11A: Gripping portion
11B: Connecting portion
11B1: Swage portion
11B2: Deformation portion
11a: Arcuate curved surface
11b: Thin portion
11b1: Slit
11b2: Groove 12: Partition film
13: Rib
20: Controller
100: Industrial robot
CL: Central axis
F: Frictional force
N: Pressing force
Q: Contact point
S1, S2: Sealed space
W: Workpiece

The invention claimed is:

1. A gripping device that grips a workpiece, the gripping device comprising:
an elastically deformable partition film;
a deformation unit that elastically deforms the partition film;
a cylindrical gripping portion that extends integrally from a peripheral edge of the partition film and is elastically deformed in a central axis direction along with elastic deformation of the partition film by the deformation unit to wrap the workpiece;
a gripping member including a cylindrical casing and the partition film that vertically partitions inside of the casing, and the gripping member having an opening portion in an upper portion thereof; and
a case member configured to close the opening portion of the gripping member,
wherein the deformation unit is connected to a sealed space defined by the case member, the casing, and the partition film to evacuate the sealed space,
wherein a lower portion of the casing partitioned by the partition film constitutes the gripping portion, and an upper portion of the casing partitioned by the partition film constitutes a connecting portion that connects the gripping member to the case member, and
a deformation portion serving as a starting point of elastic deformation of the gripping portion is provided at a boundary portion of the connecting portion with the gripping portion, and
wherein the deformation portion includes a plurality of vertical slits provided along a circumferential direction, and a multistage groove in which a plurality of circumferential grooves is vertically arranged.

2. The gripping device according to claim 1, wherein the partition film is provided integrally with the casing and on the same plane as a plane formed in a radial direction.

3. The gripping device according to claim 1, wherein a plurality of thin portions is provided in the gripping portion in the circumferential direction.

4. The gripping device according to claim 1, wherein a plurality of ribs is integrally provided along the circumferential direction between a lower surface peripheral edge of the partition film and an inner peripheral surface of the gripping portion.

5. The gripping device according to claim 1, wherein the partition film has an arcuate curved surface shape in which a central portion bulges downward in an initial state.

6. An industrial robot comprising the gripping device according to claim 1.

* * * * *